United States Patent
Melchert et al.

(10) Patent No.: US 8,648,704 B2
(45) Date of Patent: Feb. 11, 2014

(54) CONTROL DEVICE AND METHOD FOR TRIGGERING PASSENGER PROTECTION DEVICES

(75) Inventors: Jens Melchert, Gerlingen (DE); Gunther Lang, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 734 days.

(21) Appl. No.: 12/739,636

(22) PCT Filed: Sep. 30, 2008

(86) PCT No.: PCT/EP2008/063055
§ 371 (c)(1),
(2), (4) Date: Apr. 23, 2010

(87) PCT Pub. No.: WO2009/068346
PCT Pub. Date: Jun. 4, 2009

(65) Prior Publication Data
US 2010/0231401 A1    Sep. 16, 2010

(30) Foreign Application Priority Data
Nov. 28, 2007    (DE) .......................... 10 2007 057 137

(51) Int. Cl.
*B60Q 1/50*    (2006.01)
(52) U.S. Cl.
USPC ........... 340/467; 340/669; 340/436; 702/104; 702/45; 701/45; 701/36

(58) Field of Classification Search
USPC .................... 340/669, 436, 467; 702/45, 104; 701/45, 36; 180/271, 282; 280/728.1
See application file for complete search history.

(56) References Cited

U.S. PATENT DOCUMENTS 6,512,969 B1 *  1/2003  Wang .............................. 701/45
7,359,818 B2 *  4/2008  Fujimoto ..................... 702/104

FOREIGN PATENT DOCUMENTS

| | | |
|---|---|---|
| DE | 10317640 | 11/2004 |
| DE | 102004021648 | 12/2005 |
| DE | 102007017483 | 10/2007 |
| EP | 1386802 | 2/2004 |

OTHER PUBLICATIONS

International Search Report, PCT International Patent Application No. PCT/EP2008/063055, dated Feb. 12, 2009.

* cited by examiner

*Primary Examiner* — Steven Lim
*Assistant Examiner* — Hongmin Fan
(74) *Attorney, Agent, or Firm* — Kenyon & Kenyon LLP

(57) ABSTRACT

A method and a control device for triggering passenger protection devices are provided, the passenger protection devices being triggered as a function of a first acceleration signal and/or a driving dynamics signal. The acceleration signal is corrected by an offset by a comparison with the driving dynamics signal.

16 Claims, 4 Drawing Sheets

CONTROL DEVICE AND METHOD FOR TRIGGERING PASSENGER PROTECTION DEVICES

FIELD OF THE INVENTION

The present invention relates to a control device and to a method for triggering passenger protection devices.

German Patent Application No. DE 103 17 640 A1 describes modifying a threshold value for the signal from a crash sensor as a function of a driving dynamics signal. This triggers the passenger protection means as a function of the driving dynamics signal and the signal from the crash sensor.

SUMMARY

An example control device for triggering a passenger protection device according to the present invention, and an example method for triggering a passenger protection device according to the present invention, may have the advantage that the offset of an airbag acceleration sensor system is corrected by an offset correction circuit as a function of a driving dynamics signal, so that the tolerance range to be taken into account for this airbag acceleration sensor system is considerably smaller. This also makes it easier to separate trigger cases from non-trigger cases. Overall, the number of faulty triggerings is reduced in this manner.

The driving dynamics signal is especially suitable for an offset compensation because, for instance, the electronic stability program includes acceleration sensors set up to measure up to 2 g and thus have a much lower measuring range than the airbag acceleration sensor system, whose measuring range lies on the order of magnitude of 30 to 500 g. The resolution of the driving dynamics sensor system is therefore considerably finer than the resolution of the airbag sensor system. As a result, this driving dynamics sensor system is especially suitable for correcting the airbag acceleration sensor system with regard to its offset. This is particularly true if the airbag acceleration sensor system itself already includes an internal sensor offset control, i.e., one that performs sensor-internal offset regulation. In this case as well, the present invention is helpful in further restricting the tolerance range. Moreover, it is advantageous that the present components are already available in many vehicles, so that hardly any extra expense is involved, apart from implementing the arithmetic sensor-offset correction.

The example control device according to the present invention is a classic airbag control device, for instance, or also a control device that is able to be used both for airbag applications and for driving dynamics applications, or a control device that has a driving-dynamics sensor system in addition to the airbag functions. Moreover, the control device may be provided solely for processing sensor signals and for generating control signals therefrom. Thus, it is possible for this control device to be provided without its own sensor system. Characteristic therefore is the interface for providing the sensor signals, and the evaluation circuit as well as the offset-correction circuit.

In the case at hand, passenger protection devices are active as well as passive passenger protection devices such as airbags, belt tighteners, crash-active headrests and brakes, and also an electronic stability control. Triggering means an activation of these passenger protection devices.

The interfaces in this case are developed as hardware and/or software. The interfaces may be implemented as software element on a microcontroller, for instance, or be made up of ICs or parts of ICs or of a plurality of ICs, or of discrete components.

The airbag acceleration sensor system may be provided in a sensor cluster in the control device itself, separately as an upfront sensor system, and/or a side-impact sensor system. The airbag sensor system is able to detect accelerations from one axis of sensitivity or from a plurality of axes of sensitivity. The acceleration signal of the airbag acceleration sensor system may therefore include one or a plurality of sensor signal(s).

The driving dynamics signal may include a plurality of sensor signals. The driving dynamics sensor system may be provided in a driving dynamics control device or separately in an airbag control device or in a sensor cluster. The driving dynamics sensor system involves acceleration sensors and sensors for detecting the intrinsic vehicle speed. Counted among them are wheel speed sensors, in particular. It is possible to provide an offset correction for a sensor system for detecting a rollover event, for example if rate-of-rotation sensors in the electronic stability program supply a finer resolution than the rate-of-rotation sensors for detecting the rollover.

The evaluation circuit in the case at hand is a microcontroller or some other processor. An application-specific integrated circuit or a plurality of such circuits are options as well, or the evaluation circuit may be made up of discrete components. In particular, the evaluation circuit may also include a plurality of processors.

The offset correction circuit could be a circuit realized in hardware, or it could be a software element or a combination of both. In particular, it is possible for the offset correction circuit to be a function implemented by the evaluation circuit as microcontroller. In an IC, a portion of this IC may be assigned to the offset correction circuit.

An offset causes a deviation in the sensor signal, which deviation is attributable to the temperature or electromagnetic irradiation or other effects. It therefore is not the true signal that is output but rather this true signal modified by this offset. In an active airbag triggering algorithm such an offset has only a negligible effect on the acceleration signals themselves since these acceleration signals are already very high in an active airbag trigger algorithms. On the other hand, the effect of such an offset is more substantial on the integrated or twice integrated acceleration signal and therefore leads to a fairly large tolerance range. This is true also for weaker signals for which the offset plays a role. Such a tolerance range restricts the performance of airbag applications and leads to poorer separability between trigger cases and non-trigger cases.

To be distinguished from this sensor offset are weaker signals of a similar order of magnitude and attributable to driving maneuvers, which, in contrast to the sensor offset, constitute true measured values, however.

Correction means that it is first detected whether the signal from the airbag sensor was caused by actual driving maneuvers or by a sensor offset, the offset then being compensated in the latter case.

The measures and further refinements allow advantageous improvements of the example control device and the example method for triggering a passenger protection device for a vehicle.

It is advantageous if a deactivation circuit is provided, which deactivates the offset-correction circuit as a function of a threshold comparison of the airbag acceleration signal. This threshold value lies in the order of magnitude of the highest signals achievable by driving maneuvers. In the following discussion, deactivation means that the correction value determined prior to reaching the deactivation threshold is maintained, i.e., the offset correction of the airbag sensor operates on the basis of this correction value for as long as the signals lie above the deactivation threshold. The deactivation circuit may be implemented in the form of hardware and/or software, according to the offset correction circuit. Normally, the deactivation circuit may be provided as software element on the microcontroller as the evaluation circuit.

As mentioned earlier, the vehicle dynamics signal advantageously is also an acceleration signal, the vehicle dynamics system having greater sensitivity on account of it being configured for a much lower acceleration signal only, so that it is especially suitable for implementing an offset correction of the airbag acceleration sensor system.

Furthermore, it is advantageous if the offset correction circuit has a subtraction element for the comparison between the at least one first and the at least one second acceleration signal, as well as a threshold decision element for the difference produced in the process. That is to say, the acceleration determined by the airbag acceleration sensor system, and the acceleration determined by the driving dynamics acceleration sensor system, is subtracted, and this is deducted from the acceleration signal in order to obtain the offset. The subtraction element may be designed as hardware and/or software, and the same applies to the threshold decision element, analogously to the implementation of the offset correction circuit.

However, it is also advantageous if the offset correction circuit integrates the acceleration signal of the airbag acceleration sensor system for the comparison, the driving dynamics signal being the intrinsic speed of the vehicle. In the process, the difference between the intrinsic speed, which is determined at two measuring instants, may then be compared with the integrated acceleration. This difference, divided by the time, may then be deducted from the acceleration signal in order to perform the offset correction. The time therefore is the rhythm at which the intrinsic speed is updated, such as every 20 milliseconds, for example. These speed values are usually available on the CAN bus. Alternatives are possible.

Prior to forming the difference, low-pass filtering may take place in order to smooth minor fluctuations of the driving dynamics sensor having fine resolution. However, to enable the desired faster correction, the time constant of this low-pass filtering advantageously is smaller than that of the sensor internal offset regulation.

The deactivation circuit deactivates the offset correction circuit, for example when the first acceleration signal is higher than 2 g or higher than the specified noise threshold. The noise threshold may lie at 3 to 6 g, for example.

Exemplary embodiments of the present invention are depicted in the figures and described in greater detail below.

DETAILED DESCRIPTION OF EXAMPLE EMBODIMENTS

Figure 1:
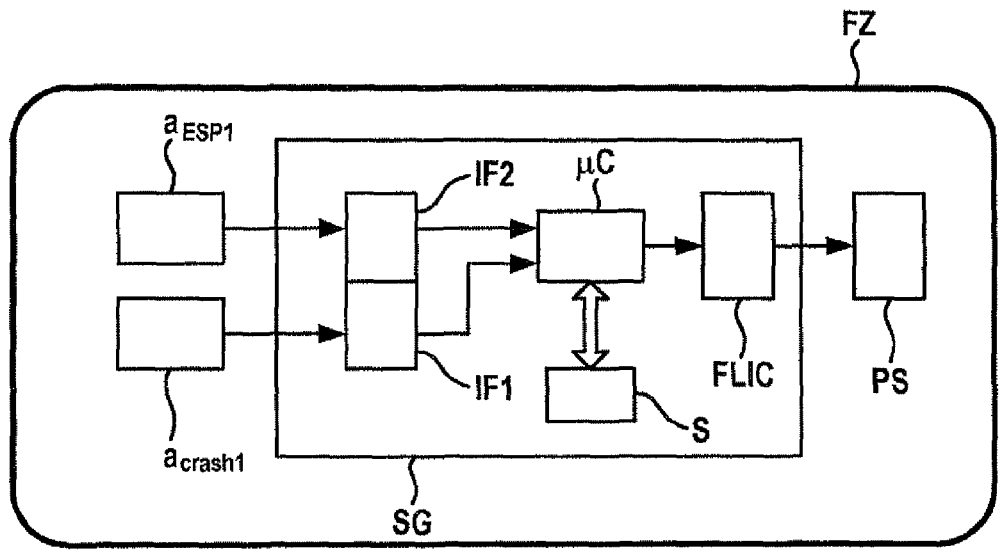
FIG. 1 shows a circuit diagram including an example control device according to the present invention and connected components.

FIG. 1 shows an example control device SG according to the present invention inside a vehicle FZ, control device SG receiving signals from an acceleration sensor system acrash1 and an additional acceleration sensor system aESP1, the systems being located outside the control device in each case. Acceleration sensor systems aESP1 and acrash 1 are connected to interfaces IF1 and IF2, respectively, these interfaces IF1 and IF2 each being situated in control device SG in the form of integrated switching circuits. Interfaces IF1 and IF2 transmit the sensor data to the evaluation circuit—microcontroller μC—via the so-called SPI (serial peripheral interface), for example. Microcontroller μC processes these acceleration signals using data it loads from its memory S. Depending on the signals, microcontroller μC decides whether or not a trigger signal should be generated. If one is generated, then microcontroller μC transmits a trigger signal to trigger circuit FLIC. Trigger circuit FLIC in this case is made up of a multitude of integrated circuits, which include power switches and a signal processor device for processing the trigger signal. Among such devices are simple logic circuits, for example. Trigger circuit FLIC then controls passenger protection device PS, which is accomplished by supplying current to ignition elements or to an electromagnetic actuator system.

According to an example embodiment of the present invention, microcontroller μC implements an offset correction of signal acrash1 based on acceleration signals acrash1 and aESP1. Signal acrash1 is corrected for this purpose, for example in such a way that it implements a difference from low-pass-filtered acrash1 signal and low-pass-filtered aESP1 signal.

Figure 2:
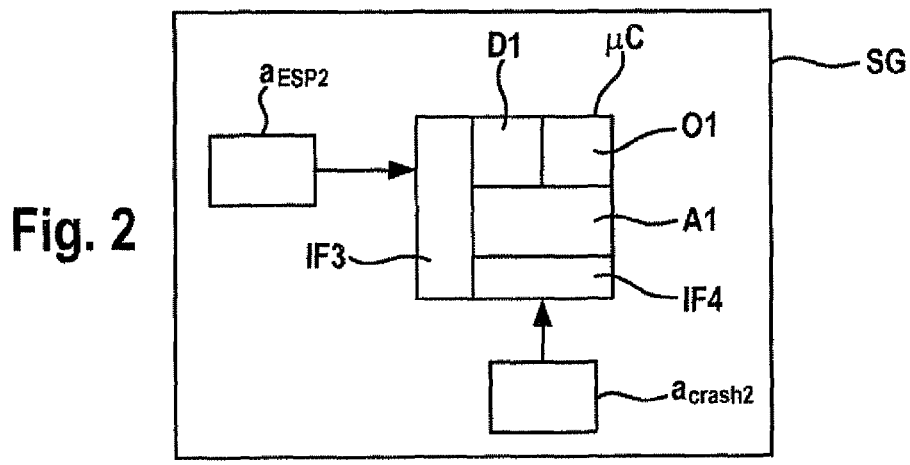
FIG. 2 shows a further block diagram of the example control device.

FIG. 2 shows an additional circuit diagram of control device SG according to the present invention. Acceleration sensor systems acrash2 and aESP2 are now located inside control device SG itself. These acceleration sensor systems acrash1 and aESP1 are then connected to software interfaces IF4 and IF3 of microcontroller μC. The offset correction is implemented by offset correction circuit O1, which in this case is provided in the form of a software element on microcontroller μC. In the process, however, a check is performed as to whether this offset correction is not switched off. This is carried out by deactivation circuit D1. Deactivation circuit D1, which is likewise provided in the form of a software element on microcontroller μC, checks the magnitude of acceleration signal acrash2. In the case at hand, signal acrash2 is compared to the noise threshold, which lies at 3 to 6 g. If acceleration signal acrash2 lies above it, then the offset correction circuit is deactivated and the old correction value is maintained. Instead of the noise threshold, other thresholds that are lower or higher may be used as well. If a threshold is used which is higher than the noise level, then in particular the fact that the acceleration signal had already been integrated plays a role. When the offset correction has, or has not, been implemented, then at least the evaluation algorithm A1 receives the acceleration signals for further processing in order to decide whether or not to generate the trigger signal. For this purpose, for example, it is possible to use trigger threshold values that have been defined in advance and that may, in particular, be implemented dynamically as well.

Figure 3:
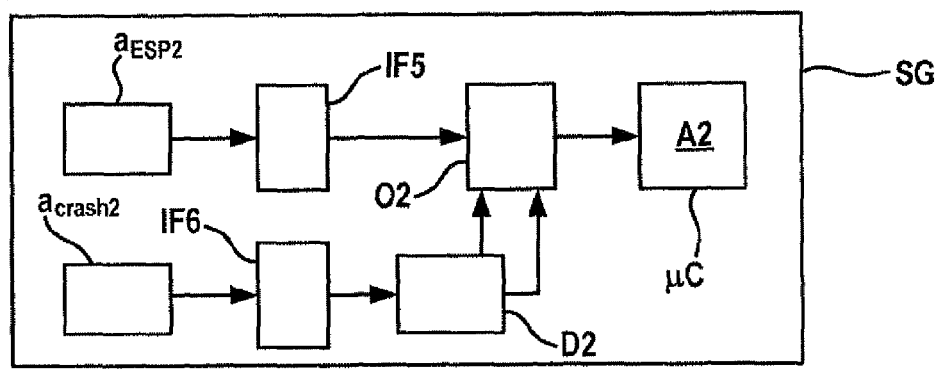
FIG. 3 shows a further block diagram of the example control device.

FIG. 3 shows an additional development variant of control device SG according to the present invention. Acceleration signal acrash2 is connected to an interface IF6, which is provided in the form of hardware. The acceleration signal then goes into a deactivation circuit D2, which implements the afore-described function. The deactivation circuit is connected to an offset correction circuit 02 via two output lines. The driving dynamics acceleration signal aESP2 also arrives in the offset correction circuit via interface IF5. The offset-corrected signal is transmitted from offset correction circuit 02 to a microcontroller μC on which evaluation algorithm A2 is running.

Deactivation circuit D2 is connected to offset circuit 02 via a signaling line in order to indicate whether or not to deactivate the offset correction circuit. Acceleration signal acrash2 is transmitted via a second line.

The illustrated figures show only the elements that may be needed for the present invention. Other elements required for the operation are omitted for the sake of clarity.

Figure 4:
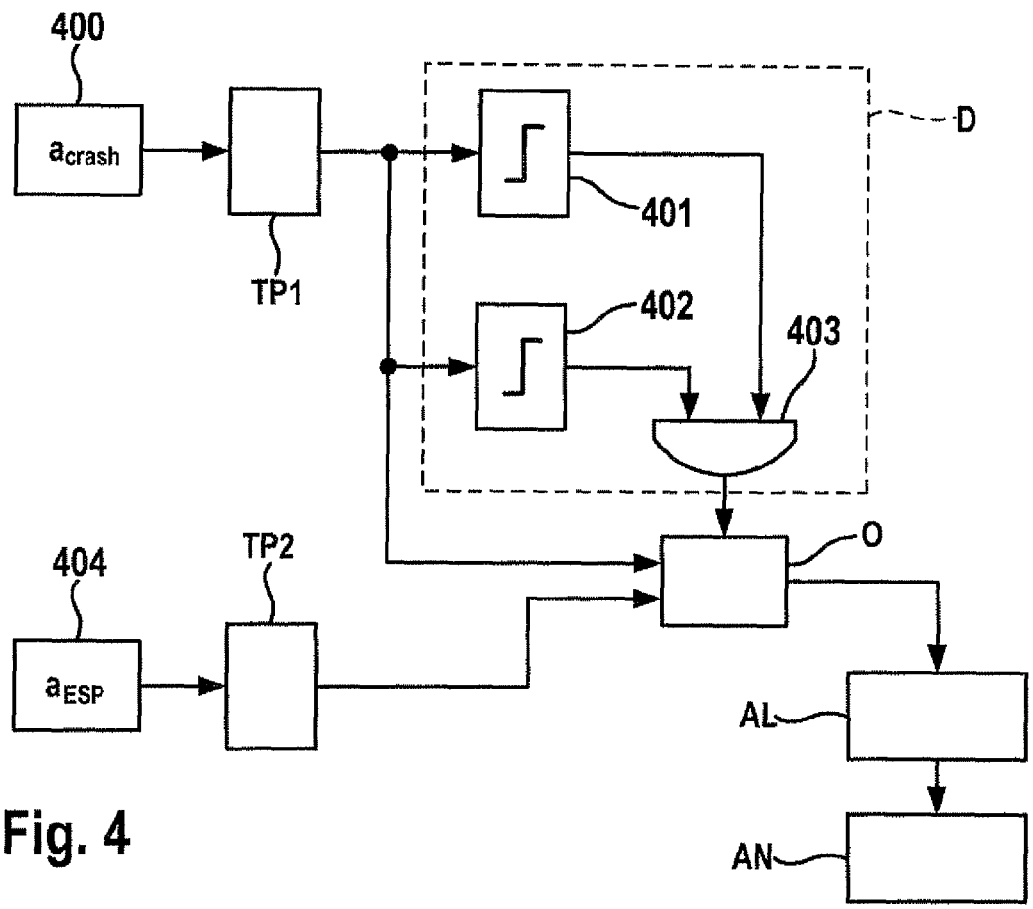
FIG. 4 shows a signal flow chart.

FIG. 4 shows a signal flow chart in order to explain the diagram according to the present invention. Airbag acceleration signal acrash is provided in block 400. This signal is then low-pass-filtered in following block TP1. In deactivation circuit D the low-pass-filtered airbag acceleration signal is forwarded to a threshold decision element 401. It is also supplied to a threshold decision element 402. The outputs of threshold decision elements 401 and 402 are transmitted to an OR gate 403. In this way the crash signal is checked with regard to a plurality of threshold values in order to decide whether or not to switch off the offset correction. It is possible that only a single threshold value is checked. Also considered in the offset correction circuit is the low-pass-filtered airbag acceleration signal. As an alternative, it is possible for the airbag acceleration signal to be considered without low-pass filtering. Also taken into account in the offset correction circuit is the driving dynamics acceleration signal provided in block 404, which was low-pass-filtered by low-pass filter TP2.

Provided the airbag acceleration signal is not too high, the offset correction circuit carries out the offset correction in the manner described and supplies the offset-corrected acceleration signal and the driving dynamics signal to airbag algorithm AL. This algorithm processes the acceleration signals in a conventional manner, for example. In block AN, the trigger signal may then be generated in the event that the airbag trigger algorithm indicates a trigger case. It is possible to enter the unfiltered acceleration signals in airbag trigger algorithm AL.

Figure 5:
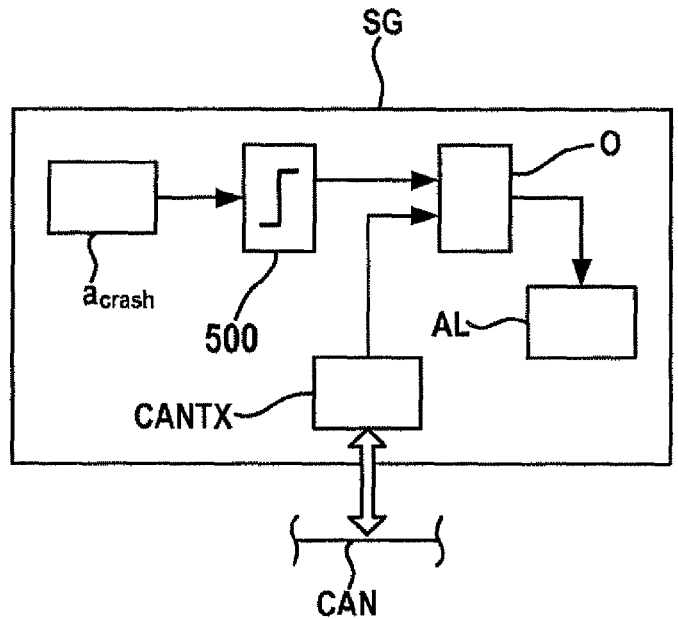
FIG. 5 shows a further block diagram of the example control device.

FIG. 5 shows an additional circuit diagram of the control device according to the present invention. Here, acceleration signal acrash is integrated, which takes place in block 500. Offset correction circuit O compares the integrated acceleration signal with the difference of the intrinsic speed between two measuring instants. The intrinsic speed is supplied by CAN transceiver CANTX. Can transceiver CANTX is connected to CAN bus CAN. Offset correction circuit O then supplies the evaluation result to the airbag algorithm, which evaluates the acceleration signals in the generally known manner.

Figure 6:
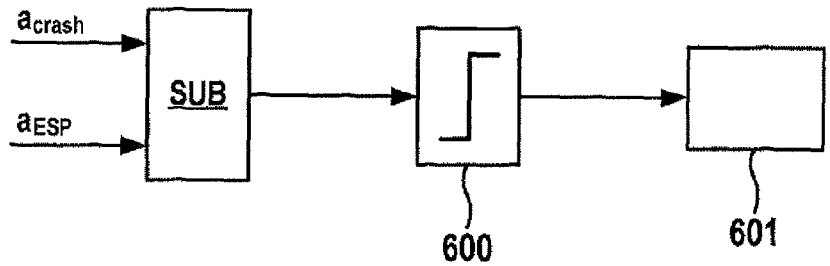
FIG. 6 shows a further signal flow chart.

FIG. 6 shows a further signal flow chart. Acceleration signal acrash and acceleration signal aESP are subtracted from one another in block SUB. Threshold decision element 600 checks this difference in order to then perform the afore-described correction in method step 601. It is possible to omit this threshold comparison.

Figure 7:
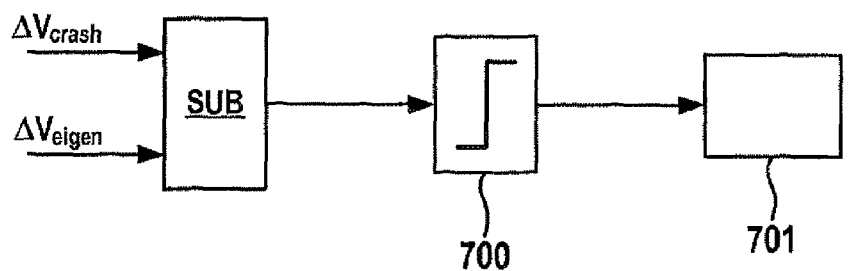
FIG. 7 shows a further signal flow chart.

FIG. 7 shows a further exemplary embodiment. Now, the integrated acceleration signal, which was integrated between two measuring points for the intrinsic speed, is subtracted from the difference of intrinsic speed δV intrinsic. Once again, optional threshold 700 may compare this difference with a specified value in order to then perform the correction in method steps 701.

Figure 8:
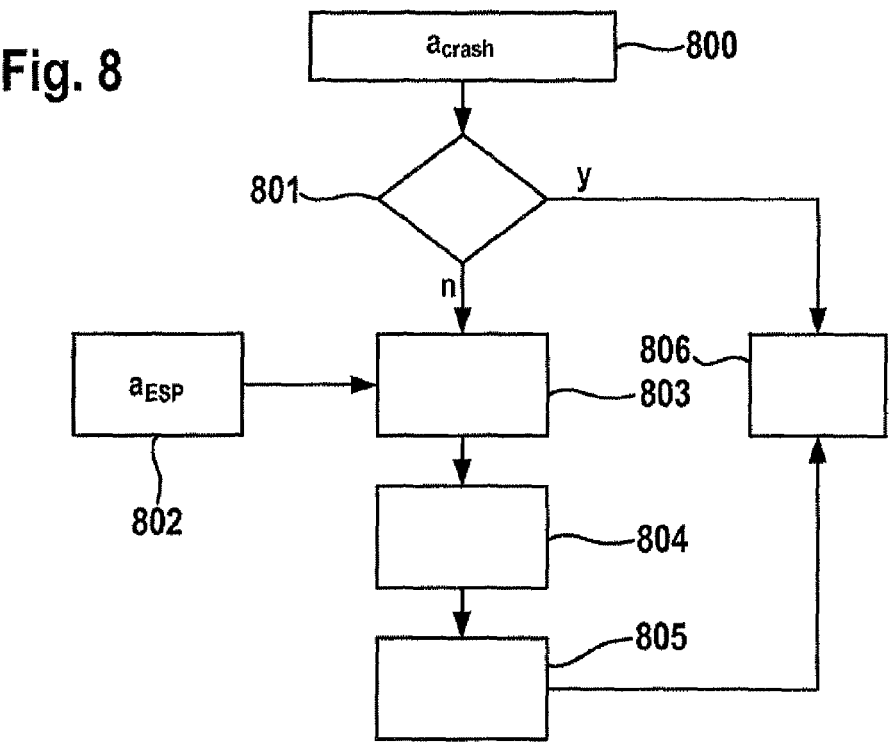
FIG. 8 shows a flow chart of an example method according to the present invention.

FIG. 8 shows a flow chart of the example method according to the present invention. In method step 800, airbag acceleration signal acrash is supplied. In method step 801, it is checked whether the offset correction is to be deactivated. If yes, then the trigger algorithm will be executed in method step 806 and the old correction value maintained. If no, then the airbag acceleration signal and acceleration signal 802 of the ESP sensor system are used for forming a difference in method step 803. This difference may optionally be subjected to a threshold value comparison in method step 804. In method step 805, the offset correction is carried out in order to then supply the offset-corrected signal to algorithm 806.

Figure 9:
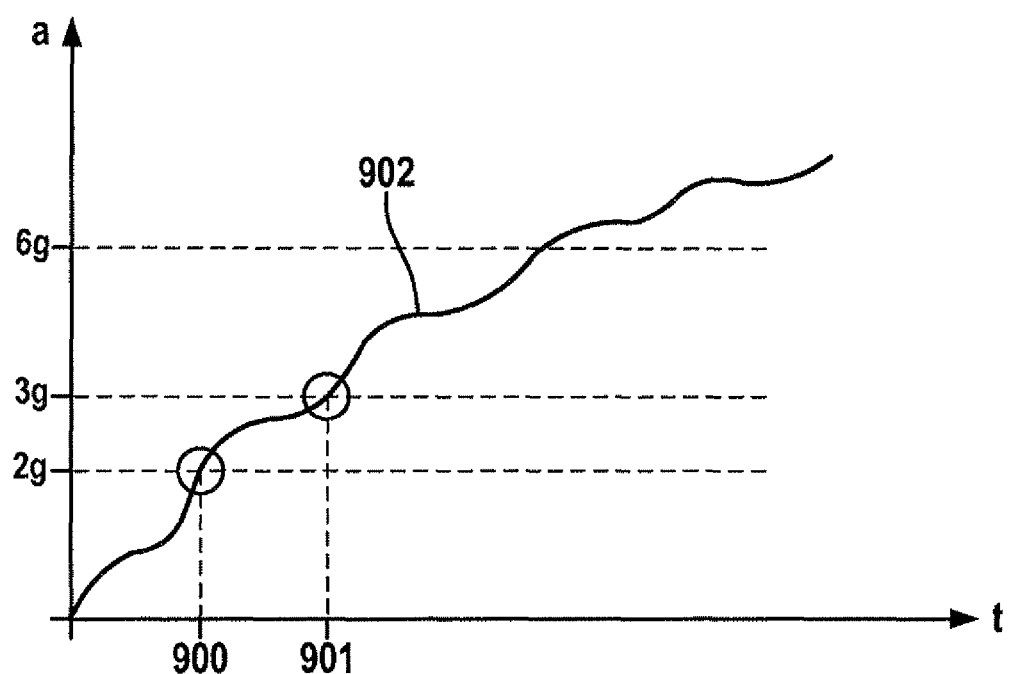
FIG. 9 shows an acceleration time chart.

FIG. 9 explains different acceleration threshold values for activating the offset correction, using an acceleration time chart. An acceleration signal 902 is shown, which increases over time. The offset correction may already be activated at a threshold of 2 g, at instant 900. As an alternative, it is possible to implement the deactivation in the band between 3 g and 6 g, i.e., in order to then switch off the offset correction and to maintain the old correction value when the noise threshold is exceeded, which was exceeded at instant 901, for example.

What is claimed is:

1. A control device for triggering a passenger protection device, comprising:
    a first interface adapted to provide at least one first acceleration signal of an airbag acceleration sensor system;
    a second interface adapted to provide at least one driving dynamics signal of a driving dynamics system that is separate from the airbag acceleration sensor system;
    an evaluation circuit adapted to trigger the passenger protection device as a function of at least one of the at least one first acceleration signal and the at least one driving dynamics signal; and
    an offset correction circuit adapted to correct the at least one first acceleration signal by an offset that is obtained by calculating a difference between the at least one driving dynamics signal and one of the at least one first acceleration signal and a value calculated from the at least one first acceleration signal.

2. The control device as recited in claim 1, further comprising:
    a deactivation circuit adapted to deactivate the offset correction circuit as a function of at least one threshold comparison of the at least one first acceleration signal, and maintain a correction value, which was reached prior to the threshold comparison.

3. The control device as recited in claim 1, wherein the at least one driving dynamics signal is at least one second acceleration signal.

4. The control device as recited in claim 3, wherein:
    the offset is obtained by calculating the difference between the at least one first and the at least one second acceleration signal; and
    the offset correction circuit has an element for calculating the difference between the at least one first and the at least one second acceleration signal, and a threshold decision element for the difference.

5. The control device as recited in claim 1, wherein the offset is obtained by calculating the difference between the at least one driving dynamics signal and the value calculated from the at least one first acceleration signal, which value is calculated at the offset correction circuit by integrating the at least one first acceleration signal to obtain a speed value, the at least one driving dynamics signal then being an intrinsic speed of the vehicle.

6. The control device as recited in claim 4, wherein low-pass filtering is provided upstream from the element for forming the difference, which has a time constant that is shorter than that of a sensor-internal offset regulation performed independently of the correction by the offset correction circuit, so that the low-pass filtering is performed at a faster rate than the sensor-internal offset regulation.

7. The control device as recited in claim 2, wherein the threshold comparison is performed in such a way that the offset correction circuit is deactivated when the at least one first acceleration signal one of amounts to more than 2 g or amounts to more than a specified noise threshold.

8. A method for triggering a passenger protection device, comprising:
    triggering the passenger protection device as a function of at least one of: i) at least one first acceleration signal, and ii) at least one driving dynamics signal of a driving dynamics system that is separate from a sensor system that generates the at least one first acceleration signal; and
    correcting the at least one first acceleration signal by an offset that is obtained by calculating a difference between the at least one driving dynamics signal and one of the at least one first acceleration signal and a value calculated from the at least one first acceleration signal.

9. The method as recited in claim 8, wherein the at least one driving dynamics signal is at least one second acceleration signal, the method further comprising:
    obtaining the offset by calculating the difference between the at least one first and the at least one second acceleration signal; and
    supplying the difference between the at least one first and the at least one second acceleration signal to a threshold decision element.

10. The method as recited in claim 8, further comprising:
    deactivating the offset correction if the at least one first acceleration signal lies one of above 2 g or above a specified noise threshold.

11. The method as recited in claim 7, wherein the offset correction circuit is deactivated when the at least one first acceleration signal amounts to more than the specified noise threshold, which lies in an order of magnitude of a highest at least one first acceleration signal achievable by driving maneuvers.

12. The method as recited in claim 10, the offset correction is deactivated when the at least one first acceleration signal lies above the specified noise threshold, which lies in an order of magnitude of a highest at least one first acceleration signal achievable by driving maneuvers.

13. The method as recited in claim 1, wherein the at least one driving dynamics signal has a finer resolution than the at least one first acceleration signal.

14. The method as recited in claim 1, wherein the driving dynamics system is an electronic stability system that uses the at least one driving dynamics signal to perform electronic stability control.

15. The method as recited in claim 8, wherein the at least one driving dynamics signal has a finer resolution than the at least one first acceleration signal.

16. The method as recited in claim 8, wherein the driving dynamics system is an electronic stability system that uses the at least one driving dynamics signal to perform electronic stability control.

\* \* \* \* \*